3,011,987
ORGANOSILOXANE COPOLYMERS
Richard K. Walton, North Plainfield, Ralph F. Sellers, Middlebush, and William G. Colclough, Jr., Somerville, N.J., assignors to Union Carbide Corporation, a corporation of New York
No Drawing. Filed Nov. 29, 1957, Ser. No. 699,491
16 Claims. (Cl. 260—18)

This invention relates to new organosiloxane copolymers and to processes for their production. More particularly, this invention is concerned with organosiloxane copolymers containing chlorine substituted hydrocarbon radicals attached to the silicon atoms of siloxy groups as new compositions of matter, with processes for producing the same, and with molding compositions and laminates prepared therefrom.

The thermosetting organosiloxane copolymers heretofore used in industry have been prepared by the cohydrolysis and partial condensation of mixtures of trifunctional and difunctional hydrocarbon silanes. The organosiloxane copolymers so obtained have found wide use in protective coatings and in the preparation of laminated articles and molding compositions. One shortcoming, however, is that molding compositions prepared therefrom do not cure or thermoset to satisfactory levels of rigidity and strength within a reasonable time under the temperature and pressure conditions normally employed by the molder. As a consequence, many molded articles cannot be removed from the mold while still hot, i.e., as soon as the molding cycle is complete, without distortion or cracking of the article. In fact, even a moderately complex molded article may actually break apart when the mold is opened with part of the article sticking to the mold force and the remainder staying in the mold cavity. Generally, the failures appear to be of a tearing type due to inadequate development of cohesive strength in the organosiloxane composition. Attempts to cure these deficiencies via a longer cure and/or a higher cure temperature result in embrittlement of the resin composition, and the molded article becomes more prone to cracking or brittle fracture when the mold is being opened or when the article is being ejected from the mold. The use of mold release agents or lubricants has shown some improvement, but the amounts generally required tend to degrade the mechanical and electrical properties of the molded articles, and in some instances "blush-out" out mar its appearance.

The present invention is based upon the discovery that organosiloxane copolymers produced by the cohydrolysis of a mixture of chlorine substituted hydrocarbon silanes and hydrocarbon silanes cure in a more advantageous manner than the organosiloxane copolymers previously known. For instance, molding compositions prepared from the organosiloxane copolymers of this invention develop sufficient rigidity and cohesive strength, and are so little inclined to over-embrittlement during molding that that molded articles can be ejected even from intricately shaped and deep-draw molds while stil lhot without cracking or deforming.

The organosiloxane copolymers of this invention may be produced by the cohydrolysis of a mixture of one or more hydrolyzable hydrocarbon silanes with one or more hydrolyzable chlorine substituted hydrocarbon silanes. The hydrolyzate so produced is then partially condensed to produce a stable, hydroxyl-containing, heat-hardenable copolymer, which can be further processed and cured. Alternatively, the several indicated silanes may be hydrolyzed individually or in convenient combinations, and the hydrolyzates can then be combined and co-condensed. The thermosetting resins so produced may be dissolved in a suitable organic solvent such as toluene, isopropanol, methyl ethyl ketone, etc. to produce varnishes suitable for use as protective coatings or in the production of laminated articles. The reaction mixture can also be desolvated and used, generally with a curing accelerator added, in potting, casting orencapsulating applications; or it can be mixed with solid fillers, cure accelerators, pigments, etc. to produce molding compositions.

The chlorine-substituted hydrocarbon silanes suitable for use in this invention may be represented by the general formula:

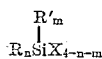

wherein R represents a chlorine-substituted hydrocarbon radical such as chloroalkyl radicals containing from 1 to about 4 carbon atoms, which are free of chlorine atoms on the beta-carbon atom relative to the silicon atom, chlorophenyl radicals containing ortmfoiETA atom, chlorophenyl radicals containing from 1 to 5 chlorine atoms attached to the carbon atoms of phenyl group, or substituted chlorophenyl groups such as alkyl or alkoxy substituted chlorophenyl radicals; R' represents a hydrocarbon radical such as an alkyl radical, an aryl radical, an alkaryl radical, an aralkyl radical, or an alicyclic radical; X represents an hydrolyzable radical such as a halogen atom as represented by chlorine, bromine or fluorine, or an alkoxy radical as represented by methoxy or ethoxy, or an aryloxy radical as represented by phenoxy; $n$ is an integer having a value of 1 or 2; and $m$ is an integer having a value of 0 or 1, and wherein the sum of $n$ plus $m$ does not exceed 2. Suitable chlorine substituted hydrocarbon radicals as represented by R are the linear or branched chloroalkyl radicals such as chloromethyl, alpha-chloroethyl, alpha-chloropropyl, gamma-chloropropyl, delta-chlorobutyl, alpha-methyl-gamma-chloropropyl and beta-methyl-gamma-chloropropyl; and the chlorophenyl radicals such as the mono-, di-, tri-, tetra-, and penta-chlorophenyl radicals or the mono- or polychlorotclyl, chloroanisyl, chloroxylyl, or chloronaphthyl radicals, and the like. Suitable hydrocarbon radicas as represented by R' are methyl, ethyl, propyl, phenyl, tolyl, xylyl, beta-phenethyl, cyclohexyl, and the like.

Illustrative of the chlorine-substituted hydrocarbon silanes suitable for use in this invention are gamma-chloropropyltrichlorosilane, beta - methyl-gamma-chloropropyltrichlorosilane, beta-methyl-gamma-chloropropyl- trichlorosilane, alpha-methyl - gamma - chloropropyltrichlorosilane, chloromethyltrichlorosilane, bis-(gamma-chloropropyl)-dichlorosilane, chlorophenyltrichlorosilane, dichlorophenyltrichlorosilane, pentachlorophenyltrichlorosilane, as well as mixtures thereof.

The hydrocarbon silanes suitable for use in this invention may be represented by the general formula:

$$R'_p SiX_{4-p}$$

wherein R' and X have the same meanings as hereinbefore indicated; and $p$ is an integer having a value of from 0 to 3.

Illustrative of the hydrocarbon silanes suitable for use in this invention are methyltrichlorosilane, dimethyldichlorosilane, phenyltrichlorosilane, diphenyldichlorosilane, methylphenyldichlorosilane, methyltriethoxysilane, phenyltriethoxysilane, diphenyldiethoxysilane, amyltrichlorosilane, phenethyltrichlorosilane, methylphenyldiethoxysilane, methylethoxydichlorosilane, dimethyldiethoxysilane and ethyltrichlorosilane, as well as mixtures thereof. The reaction mixture of these and similar di- and trifunctional organosilanes may be prepared from purified monomers or monomer mixtures, or from commercially available materials. A small amount of a monofunctional hydrocarbon silane may be added as a chain end-blocker to keep the molecular weight of the organosiloxane within the desired limits. In addition, small amounts of tetrafunctional silanes such as silicon tetrachloride or tetraethyl silicate can be added to increase the functionality of the resin by supplying more cross-linking points. In general, the total amount of such modifiers is limited to quantities not in excess of 5 mole percent of the silane mixture.

The proportions of chlorine substituted hydrocarbon silanes and hydrocarbon silanes can be varied to provide a composition with the molar ratio of R:Si within the range of from about 0.05:1 to about 0.6:1 and preferably from about 0.1:1 to about 0.45:1. The molar ratio of the sum of R plus R':Si may vary from about 0.95:1 to about 1.5:1 with the preferred range being from about 1:1 to about 1.35:1; wherein Si represents the total amount of Si present in the mixture.

The organosiloxane copolymers of this invention having R:Si molar ratios of from about 0.1:1 to about 0.45:1 and R plus R':Si molar ratios of from about 1:1 to about 1.25:1 are generally preferred for the preparation of molding compositions; whereas, those organosiloxane copolymers of this invention which have R:Si molar ratios of from about 0.1:1 to about 0.45:1 and R plus R':Si molar ratios of from about 1.15:1 to about 1.35:1 are generally preferred for use in varnish compositions and in the preparation of laminated articles.

In one method for producing the organosiloxane copolymers of this invention, a hydrolyzable mixture of chlorine substituted hydrocarbon silanes and hydrocarbon chlorosilanes is cohydrolyzed by slowly adding the mixture at a temperature below about 30° C. to a vigorously agitated slurry of an acid acceptor, such as an alkali metal carbonate or bicarbonate or an alkaline earth metal carbonate or bicarbonate, suspended in an organic solvent, such as ether, toluene or acetone containing a small amount, generally not more than about 2% by weight, of water. The reaction slurry is then filtered to remove insoluble inorganic salts and a suitable condensation catalyst is added to the filtrate. After partially condensing the hydrolyzate by heating for a short period of time, the solvents may be distilled off to yield a viscous liquid or solid product; or additional solvent may be added to the condensed product to produce a varnish having a resin content of from about 30% to about 75% by weight.

In another method for carrying out this invention, a hydrolyzable mixture of chlorine substituted hydrocarbon silanes and hydrocarbon silanes is added at a temperature below about 50° C. to a vigorously agitated two-phase system consisting of water and an organic solvent immiscible in water, such as petroleum ether or isopropyl ether. The aqueous layer containing the hydrolysis by-products dissolved therein is then separated from the organic layer which is further washed with fresh water until free of said by-products. The organic layer may then be treated as described in the previous paragraph.

Alternatively, a solution of the mixture of hydrolyzable silanes in an organic solvent may be used in either of the above-described embodiments; or the silane mixture or a solution thereof may be hydrolyzed by pouring it into cold water or on to cracked ice, and the by-products formed are then washed out with water, and the hydrolyzate is condensed and finished as described above.

It is generally preferred to carry out the partial condensation in the presence of a weakly alkaline nitrogen-containing condensation catalyst whereby there is produced a reactive, stable, low molecular weight, hydroxyl-containing copolymer. Illustrative of such catalysts are ammonia, ammonium hydroxide and the organoamines and amides such as the primary alkylamines, for example: methyl-, ethyl-, propyl-, and butylamines; the secondary alkylamines, for example: dimethyl-, diethyl-, dipropyl-, and dibutylamines, including the mixed secondary amines such as methylethylamines; the tertiary alkylamines, for example: trimethyl-, triethyl-, tripropyl-, and tributylamines; the primary, secondary and tertiary hydroxyl alkylamines such as ethanolamine, diethanolamine, triisopropanolamine, and triethanolamine; the heterocyclic amines, for example: morpholine and pyridine; amides such as urea and substituted ureas; and the like.

The partial condensation may also be carried out in the presence of acidic or soluble metal-containing condensation catalysts. In such instances the reactive copolymer produced tends to have a higher molecular weight and a lower hydroxyl content. Illustrative of such catalysts are the fatty acid salts such as the stearates or octoates of calcium, zinc, cobalt and tin; weakly acidic materials such as boric acid; moderately acidic sulfonamides; and metallo-organo compounds such as dicyclopentadienyl zirconium dichloride and other ferrocene-like compounds. This partial condensation may also be catalyzed with a relatively strong base such as sodium hydroxide, magnesium oxide, barium oxide, guanidine carbonate, quaternary ammonium hydroxides, and the like; or it may be carried out in the absence of any added condensation catalyst to produce the partially condensed organosiloxane copolymers of this invention. However, such strong base catalyzed and uncatalyzed condensations tend to be more difficultly and less reliably controllable.

The organosiloxane copolymers of this invention are comprised of siloxane units and may be represented by the following general formulae:

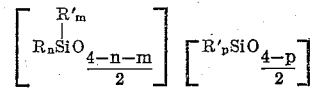

wherein R, R', $m$, $n$ and $p$ have the same meanings as hereinbefore indicated. These copolymers also contain a number of silanic hydroxyl groups (not shown) randomly scattered along the copolymer chain which on heating condense with each other to form cross-links between the respective silicon atoms to which they are attached, and thus produce insoluble infusible resinous products containing structural units having the same formulae as shown above, but containing fewer silanic hydroxyl groups.

For example, a copolymer produced from a mixture of dichlorophenyltrichlorosilane, chloropropyltrichlorosilane, methyltrichlorosilane and dimethyldichlorosilane would have the following siloxy groups present:

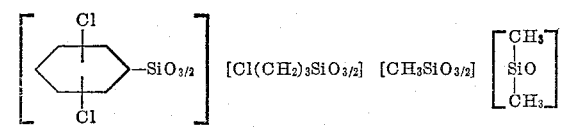

Th partially condensed chlorine-containing organo-siloxane copolymers of this invention can be readily compounded with fillers, pigments, accelerators and lubricants by methods known to the art, for example, by milling or kneading techniques. Suitable molding compositions may be obtained by compounding from about 20 to about 50 parts by weight of said organosiloxane copolymers with from about 0.1 to about 2 parts by weight of cure accelerator, from about 0.5 to about 3 parts by weight of lubricant, and from about 50 to about 80 parts by weight of filler, per 100 parts by weight of molding composition, on a two-roll mill at a temperature of from about 100° C. to about 130° C. Pigments or other heat-stable colorants may be added during the compounding if desired.

Among the suitable cure accelerators may be mentioned the metal salts of fatty acids such as zinc, lead, aluminum or calcium stearates, triethanolamine, diethanolamine, the adduct of two moles of formaldehyde with ethylenediamine, the ethyene diaminebenzaldehyde adduct, lead oxide, barium oxide, calcium hydroxide, quaternary ammonium bases, and the like.

As lubricants one may use fatty acids such as stearic, myristic and oleic acids, or the metal salts thereof such as calcium, aluminum or zinc salts, or natural or synthetic waxes.

The preferred fillers are inorganic in nature and include materials such as silica, clay, diatomaceous earth, mica, asbestos and glass fibers. Cellulosic fillers and other natural and synthetic fibers, metallic powders and fibers, alkaline earth carbonates, and the like may also be used where lesser levels of heat resistance and electrical properties are suitable.

The molding compositions produced with the chlorine-containing organosiloxane copolymers of this invention behave more reproducibly during molding and are less critical to accidental minor variations in molding conditions than molding compositions prepared from heretofore known siloxane copolymers; and they may be used to produce molded articles which can be ejected hot from the mold without deformation or cracking even when intricately shaped articles are produced, or when deep-draw molds are employed. The articles so produced cool to hard, insoluble, infusible, rigid pieces, and do not require any after-bake treatment to complete the curing cycle. The molding procedure may be carried out under conventional conditions; for example, compression moldings can be carried out at temperatures of from about 150° C. to about 200° C., and pressures of from about 1500 p.s.i. to about 4000 p.s.i. for a period of time of from about 3 to about 10 minutes, while transfer moldings are carried out at pressures of from about 3500 p.s.i. to about 15000 p.s.i. The cured moldings have better mechanical strengths, flame resistance, water resistance, and high temperature stability, and at least as good dielectric strength, dielectric constant, power factor and loss factor as moldings prepared from heretofore known siloxane resin molding compositions.

The varnishes which can be produced with the chlorine-containing organosiloxane copolymers of this invention can be used as protective coatings, and they can also be used in the production of laminated structures. In producing a laminate a fibrous material, such as a cloth or mat of fibrous material, for example a glass fiber cloth or mat, is impregnated with the catalyzed varnish solution. The solvent is then driven off by controlled heating in an oven, and a multiplicity of layers of the impregnated fibrous material are then molded under pressure and heat to form the laminated product. The laminates so produced may vary in resin content from about 30% to about 70% by weight based on the total weight of the finished laminate. Glass cloth laminates produced with the organosiloxane copolymers of this invention had better high temperature stability than laminates made from heretofore known siloxanes, and their strength and electrical properties were at least as good or better.

The following examples further illustrate this invention.

EXAMPLE I

A Pyrex flask, equipped with a stirrer, thermometer and addition funnel, was charged with 2960 grams of sodium bicarbonate and 6000 grams of commercial methyl ethyl ketone having a water content of less than 1% by weight, and then immersed in a cooling bath. A mixture of 1346 grams of dichlorophenyltrichlorosilane, 718 grams of methyltrichlorosilane and 310 grams of dimethyldichlorosilane was prepared and slowly added below the the surface of the agitated sodium bicarbonate-methyl ethyl ketone slurry during a 2½ hour period at such a rate that the temperature was maintained at about 30° C. during the addition. The R:Si molar ratio was 0.4:1, and the R plus R':Si molar ratio was 1.2:1. After the addition was completed, 4 ml. of distilled water was added, and the mixture was stirred an additional 40 minutes. The pH was 6.5. The slurry was filtered, and the filter cake was washed with about 1200 grams of methyl ethyl ketone. There was added 3 grams of triisopropanolamine to the combined filtrates, and the solution was concentrated by boiling off the solvents at atmospheric pressure to a pot temperature of 140° C. The pressure was then gradually reduced, and heating continued so that a residue temperature of 150° C. at a pressure of 60–65 mm. of Hg was reached in about 10 minutes. The partially condensed molten organo-siloxane copolymer was poured into a pan and cooled quickly. There was obtained 1128 grams of a clear, colorless, grindable resin having an as-is 150° C. hot plate gel time of over 600 seconds. The 150° C. hot plate gel time after the addition of 2% by weight of ethylene diamine formaldehyde adduct was 83 seconds.

In Table I there are tabulated additional examples in which the process described in Example 1 was used. In all examples hydrolysis was conducted at about 30° C. using 2960 grams of sodium bicarbonate and 6000 grams of methyl ethyl ketone.

Table I

| Example | 2 | 3 | 4 | 5 | 6 | 7 | 8 | 9 | 10 | 11 | 12 |
|---|---|---|---|---|---|---|---|---|---|---|---|
| Methyltrichlorosilane, g | 718 | 718 | 822 | 930 | 718 | 930 | 835 | 1,070 | 890 | 712 | 536 |
| Dimethyldichlorosilane, g | 310 | 310 | 228 | 150 | 310 | 150 | 74 | 137 | 137 | 137 | 137 |
| Phenyltrichlorosilane, g | 761 | 508 | 480 | 450 | | | 506 | 530 | 530 | 530 | 530 |
| Dichlorophenyltrichlorosilane, g | 337 | 673 | 635 | 598 | | | | | | | |
| Chlorophenyltrichlorosilane, g | | | | | 1,180 | 1,048 | | | | | |
| Gamma-chloropropyltrichlorosilane, g | | | | | | | 604 | 252 | 504 | 757 | 1,009 |
| R:Si | 0.1 | 0.2 | 0.19 | 0.18 | 0.4 | 0.37 | 0.25 | 0.10 | 0.20 | 0.30 | 0.40 |
| R plus R':Si | 1.20 | 1.20 | 1.15 | 1.10 | 1.20 | 1.10 | 1.05 | 1.09 | 1.09 | 1.09 | 1.09 |
| Triisopropanolamine, g | 3 | 3 | 3 | 2 | 3 | 4 | 7.5 | 1 | 3 | 7 | 10 |
| Yield, g | 1,044 | 1,128 | 1,065 | 1,075 | 1,145 | 1,151 | 1,095 | 1,040 | 1,060 | 1,105 | 1,235 |
| Gel time, sec.: | | | | | | | | | | | |
| As is | ←————————More than 600————————→ | | | | | | 270 | >600 | >600 | 141 | |
| With 2% EDF [1] added | [2] 140 | 145 | 84 | 53 | 365 | 64 | 17 | 19 | 21 | 8 | |

[1] EDF=ethylenediamine formaldehyde adduct.
[2] With 1% EDF added.

NOTE.—The products of Examples 6 and 12 were soft resins, whereas all of the other products were grindable resins.

EXAMPLE 13

A mixture was prepared containing 703 grams of dichlorophenyltrichlorosilane, 138 grams of dimethyldichlorosilane and 1247 grams of methyltrichlorosilane. The R:Si molar ratio was 0.21:1 and the R plus R':Si molar ratio was 1.09:1. One half of this mixture was added to an agitated mixture of about 6000 ml. of isopropyl ether and 2100 ml. of water over a 105 minute period with the addition rate adjusted and external cooling applied as needed to keep the reaction mass temperature below 50° C. After 5 minutes' additional stirring, the strongly acidic water layer was removed, and replaced with 1200 ml. of fresh water. Half of the remaining silane mixture was added over a period of about 45 minutes, and the water layer was again removed and replaced with 1200 ml. of fresh water. The remainder of the silane mixture was added over a period of about 45 minutes, and then the water layer was drained off. The ether solution was washed with successive 2500 ml. portions of water until its pH was about 5. Two grams of triisopropanolamine dissolved in about 5 ml. of toluene was added to the ether solution, which was then concentrated by distilling off the solvents at atmospheric pressure to a pot temperature of 120° C. in about 1.5 hours. The pressure was then gradually reduced and heating continued so that a residue temperature of 130° C. at 50 mm. pressure of Hg was reached in 10 minutes. The partially condensed molten organosiloxane was discharged and cooled. There was obtained 1145 grams of a faintly hazy, grindable resin having an as-is 150° C. hot plate gel time of over 600 seconds. The 150° C. hot plate gel time after the addition of 2% by weight of ethylenediamine formaldehyde adduct was about 30 seconds.

In Table II there are tabulated additional examples in which the process described in Example 13 was used. In all examples the hydrolysis was conducted at about 50° C. using 6000 ml. isopropyl ether and a total volume of about 4500 ml. of water.

*Table II*

| Example | 14 | 15 | 16 | 17 |
|---|---|---|---|---|
| Methyltrichlorosilane, g | 1,262 | 1,247 | 1,070 | 890 |
| Dimethyldichlorosilane, g | 74 | 138 | 137 | 137 |
| Dichlorophenyltrichlorosilane, g | | | | 703 |
| Chlorophenyltrichlorosilane, g | 588 | 615 | 703 | |
| Gamma-chloropropyltrichlorosilane, g | | | 252 | 504 |
| R:Si | 0.21 | 0.21 | 0.31 | 0.41 |
| R plus R':Si | 1.05 | 1.09 | 1.09 | 1.09 |
| Triisopropanolamine, g | 4 | 4 | 2 | 5 |
| Yield, g | 1,020 | | 1,230 | 1,310 |
| Gel time, sec.: | | | | |
| As is | ←———More than 600———→ | | | |
| With 2% EDF¹ added | 23 | 20 | 27 | 27 |

¹ EDF=ethylenediamine formaldehyde adduct.

NOTE.—All of the products were grindable resins.

EXAMPLE 18

A solution of 491 grams of ethyltrichlorosilane and 561 grams of dichlorophenyltrichlorosilane in 400 ml. of toluene was added to a slurry of 1260 grams of sodium bicarbonate in 6000 grams of commercial grade toluene over a 47 minute interval. The mixture was agitated another 30 minutes and filtered to remove the sodium chloride formed during the reaction. The R:Si molar ratio was 0.4:1, and the R plus R':Si molar ratio was 1:1. The toluene was vacuum distilled at 60–65 mm. pressure to a pot temperature of 85° C.; then 350 grams of toluene was added, and the mixture was refluxed atmospherically with the condensate passing through a separator, which rejected the water and returned the toluene to the reaction flask until no more water came over. The varnish remaining in the flask had a solids content of 60% by weight as determined by heating a 2 grams sample for 1 hour at 145° C. in an open, 2-inch diameter container.

EXAMPLE 19

A solution of 49 grams of ethyltrichlorosilane, 77 grams of pentachlorophenyltrichlorosilane, 300 grams of commercial toluene and 100 grams of acetone was slowly added to an agitated slurry of 126 grams of sodium bicarbonate in 400 grams of toluene. The R:Si molar ratio was 0.4:1, and the R plus R':Si molar ratio was 1:1. The mixture was stirred an additional hour and filtered to remove sodium chloride formed during the reaction. The filtrate was concentrated at atmospheric pressure to a pot temperature of 110° C. The residual chloroganosiloxane varnish had a solids content of 33% by weight as determined by heating a 2 grams sample for one hour at 145° C. in an open, 2 inch diameter container.

EXAMPLE 20

A mixture of 636 grams of gamma-chloropropyltrichlorosilane, 309 grams of dimethyldichlorosilane, 304 grams of diphenyldichlorosilane, 359 grams of methyltrichlorosilane and 635 grams of phenyltrichlorosilane was cohydrolyzed in substantially the same manner as described in Example I using 2860 grams of sodium bicarbonate, and 5000 grams of acetone. The R:Si molar ratio was 0.25:1, and the R plus R':Si molar ratio was 1.3:1. The reaction mixture was stirred another 45 minutes, filtered, and the filter cake was washed with about 1200 grams of acetone. The combined filtrates were concentrated by distilling off the solvent at atmospheric pressure until the pot temperature reached and remained at 120° C. for about 15 minutes. Added 575 grams of toluene to the reaction, and the solution was refluxed atmospherically with the condensate passing through a separator which rejected the water and returned the toluene to the reaction flask until no more water came over. Cooled the mixture to about 80° C. and diluted with 115 grams of isopropanol. The chloroganosiloxane varnish weighed 2040 grams, and had a solids content of 65.4% by weight as determined by heating a 2 grams sample for 10 minutes at 160° C. in open, 2 inch diameter container. The 150° C. hot plate gel time after the addition of 0.03% benzoyl peroxide and 0.035% choline by weight, based on the resin content, was 88 seconds.

EXAMPLE 21

A mixture of 1350 grams of dichlorophenyltrichlorosilane, 309 grams of dimethyldichlorosilane, 304 grams of diphenyldichlorosilane and 538 grams of methyltrichlorosilane was cohydrolyzed substantially as described in Example 20. The R:Si molar ratio was 0.4:1 and the R plus R':Si molar ratio was 1.3:1. After filtration the pH of the filtrate was adjusted to about 7.8 with 12.5 grams of triisopropanolamine. The solution was then concentrated and further processed as described in Example 20, except that the amounts of toluene and isopropanol were 625 grams and 125 grams, respectively. The chlororganosiloxane varnish weighed 2415 grams, and had a solids content of 67.1% by weight as determined by the method of Example 20. The 150° C. hot plate gel time after the addition of 0.03% benzoyl peroxide and 0.035% choline by weight, based on the resin content, was 53 seconds.

EXAMPLE 22

A mixture of 675 grams of dichlorophenyltrichlorosilane, 309 grams of dimethyldichlorosilane, 304 grams of diphenyldichlorosilane, 539 grams of methyltrichlorosilane and 508 grams of phenyltrichlorosilane was cohydrolyzed, and then condensed and finished substantially as described in Example 21, except that the pH of the filtrates was adjusted with 6 grams of triisopropanolamine before concentration thereof, and 600 grams of toluene and 100 grams of isopropanol were used. The R:Si molar ration was 0.2:1, and the R plus R':Si molar ratio was 1.3:1. The chloroganosiloxane varnish weighed 1820 grams, and had a solids content of 69.7% by weight as determined by the method of Example 20. The 150° C. hot plate gel time after the addition of 0.03% benzoyl peroxide and 0.035% choline by weight, based on the resin content, was 28 seconds; addition of 0.3% by weight of aminoethylethanolamine gave a gel time of 240 seconds.

EXAMPLE 23

A mixture of 674 grams of dichlorophenyltrichlorosilane, 310 grams of dimethyldichlorosilane, 718 grams of methyltrichlorosilane and 508 grams of phenyltrichlorosilane was cohydrolyzed substantially as described in Example 20. The R:Si molar ratio was 0.2:1 and the R plus R':Si molar ratio was 1.2:1. After filtration, 3 grams of triisopropanolamine was added, and the filtrate was then concentrated. Added 300 grams of toluene to the concentrate and refluxed to remove water as described in Example 20, then diluted with about 600 grams of toluene. The chlororganosiloxane varnish weighed 1900 grams, and had a solids content of 56.2% by weight as determined by the method of Example 20. The 150° C. hot plate gel time after the addition of 0.5% triethanolamine by weight, based on the resin content, was about 7 minutes.

EXAMPLE 24

A mixture of 600 grams of the chlororganosiloxane prepared in Example 13, 20 grams of calcium stearate and 1380 grams of milled glass fibers having an average length of about ⅛ inch was ball milled for about 15 minutes. The blend was fluxed on a two-roll mill, front roll about 100° C. and back roll about 130° C., and then milled 90 second to a smooth sheet. The sheet was cooled and granulated. Octal base, type 537 tube bases having a 90 mil base were prepared by charging 9.3 grams of granulated product to a mold and molding at a total pressure of 6000 lbs. at 185° C. for 5 minutes. All of the tube bases left the mold cavity cleanly and were easily removed undistorted from the mold force.

In Table III are listed additional examples of molding material compositions prepared as above with other chlororganosiloxanes of this invention. Ninety mil, octal tube bases, molded by the above-indicated process, were prepared without difficulty with the molding compositions of Examples 25 to 34. Whereas, attempts to produce tube bases using conventional polysiloxane molding compositions, which did not contain any chlorine-substituted hydrocarbon radicals attached to the silicon atom, were unsuccessful, and the moldings broke as the mold was opened. The molding compositions of Examples 25, 28 and 30 when molded to rectangular bars 1″ x 5″ x ⅛″ at 168° C. and 2000 p.s.i. had hot flexural strengths of 660, 620 and 620 p.s.i. respectively, as against only 410 p.s.i. for a conventional polysiloxane molding composition free of chlorine.

trichlorosilane, having an R′:Si molar ratio of 1.2:1. This panel had an initial flexural strength of 18,400 p.s.i.; and after aging 342 hours at 284° C., the flexural strength was 10,600 p.s.i.

EXAMPLE 40

The varnish of Example 22 was diluted with toluene to 50% solids content, catalyzed with 0.3% by weight of aminoethylethanolamine and then used to impregnate glass cloth. Twenty-two 12 inch square pieces of impregnated glass cloth, which had a 45% resin content, were laminated to form an 0.15 inch laminated panel by curing the stack for 0.5 hour at 160° C. under a pressure of 1000 p.s.i., and then post-curing for 16 hours at 80° C., 2 hours at 100° C., 2 hours at 150° C., 2 hours at 200° C. and finally 2 hours at 250° C.

The properties of the above-prepared, laminated panel are compared, in the following table, with those of a laminated panel prepared by the same procedure using a conventional polysiloxane varnish produced from a mixture of 3.6 moles of methyltrichlorosilane, 2.4 moles of dimethyldichlorosilane, 4.8 moles of phenyltrichlorosilane and 1.2 moles of diphenyldichlorosilane having an R′:Si molar ratio of 1.3:1.

| Laminate from | Ex. 40 | Conventional Varnish |
|---|---|---|
| Flexural strength, at 25° C., p.s.i. | 31,200 | 31,100 |
| Dielectric strength, parallel to laminations: | | |
| A, KV | 55 | 40 |
| B, KV | 50 | 30 |
| Power factor, at 60 cycles: | | |
| A | 0.05 | 0.06 |
| C | 0.08 | 0.09 |
| Power factor, at 10⁶ cycles: | | |
| A | 0.004 | 0.003 |
| C | 0.005 | 0.01 |
| Dielectric constant at 60 cycles: | | |
| A | 4.2 | 4.4 |
| C | 4.5 | 4.9 |
| Dielectric constant, at 10⁶ cycles: | | |
| A | 3.7 | 3.8 |
| C | 3.8 | 3.9 |

NOTE.—A=As-is laminate. B=After 48 hours immersion in 50° C. water. C=After 24 hours immersion in 23° C. water.

*Table III*

| Example | 25 | 26 | 27 | 28 | 29 | 30 | 31 | 32 | 33 | 34 | 35 | 36 | 37 [2] | 38 [2] |
|---|---|---|---|---|---|---|---|---|---|---|---|---|---|---|
| Source of resin | 13 | 15 | 8 | 9 | 9 | 10 | 11 | 16 | 16 | 17 | 2 | 7 | 18 | 19 |
| Resin, g | 600 | 600 | 600 | 600 | 600 | 600 | 600 | 600 | 600 | 600 | 390 | 500 | 500 | 200 |
| EDF,[1] g | | | | | | | | | | | 2 | 2.6 | 209 | |
| Calcium stearate, g | | | 20 | 20 | | 20 | 20 | 20 | | | 20 | 20 | | |
| Zinc stearate, g | 20 | 20 | | | 20 | | | | 20 | 20 | | | | |
| Stearic acid, g | | | | | | | | | | | | | 1.25 | 0.67 |
| Glass fibers, g | 1,380 | 1,380 | 1,380 | 1,380 | 1,380 | 1,380 | 1,380 | 1,380 | 1,380 | 1,380 | | | 125 | 67 |
| Silica, g | | | | | | | | | | | 1,588 | 1,027 | | |
| Diatomaceous earth, g | | | | | | | | | | | | 390 | | |

[1] EDF=ethylenediamine-formaldehyde adduct.
[2] Molding compositions were prepared using the resin varnish indicated by a simple mixing process, and then drying to remove solvent.

EXAMPLE 39

The varnish of Example 23 was diluted to 50% solids content with toluene and 0.5% by weight of triethanolamine, based on resin content, was added. This was charged to the pan of a small laboratory treater and a roll of desized, open weave, continuous filament glass cloth was passed through the varnish and then through a 24 foot long drying oven set at 125° C. at a rate of about 8 feet per minute. The dried, treated cloth contained about 45% resin. A panel 0.15 inch thick was prepared by laminating 22 twelve inch square pieces. The laminate was prepared by curing for 0.5 hour at 160° C. under a pressure of 1000 p.s.i., and then post-curing for 16 hours at 100° C., 2 hours at 150° C., 2 hours at 200° C., 2 hours at 225° C., and finally 2 hours at 250° C. The panel had an initial flexural strength of 30,900 p.s.i.; and after aging 342 hours at 284° C., the flexural strength was 15,800 p.s.i.

A laminated panel was produced by the same process using a conventional polysiloxane varnish, produced from a mixture of 2.4 moles of dimethyldichlorosilane, 4.8 moles of methyltrichlorosilane and 4.8 moles of phenyl-

What is claimed is:

1. Partially condensed organosiloxane copolymers containing structural units which are represented by the formulae:

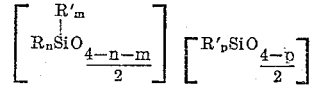

wherein R represents a member selected from the group consisting of chlorophenyl radicals containing from 1 to 5 chlorine atoms attached to the carbon atoms of the phenyl group, alkyl-substituted chlorophenyl radicals and alkoxy-substituted chlorophenyl radicals; R′ is a monovalent hydrocarbon radical; $n$ is an integer having a value of 1 and 2; $m$ is an integer having a value of 0 and 1; and $p$ is an integer having a value of from 0 to 3; and the sum of $n$ plus $m$ does not exceed 2, and wherein the average molar ratio of R:Si is from about 0.05:1 to about 0.6:1 and the average molar ratio of the sum of R plus R′:Si is from 0.95:1 to about 1.5:1.

2. Partially condensed organosiloxane copolymers containing structural units which are represented by the formulae:

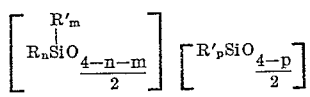

wherein R represents a member selected from the group consisting of chlorophenyl radicals containing from 1 to 5 chlorine atoms attached to the carbon atoms of the phenyl group, alkyl-substituted chlorophenyl radicals and alkoxy-substituted chlorophenyl radicals; R' is a monovalent hydrocarbon radical; $n$ is an integer having a value of 1 and 2; $m$ is an integer having a value of 0 and 1; and $p$ is an integer having a value of from 0 to 3; and the sum of $n$ plus $m$ does not exceed 2, and wherein the average molar ratio of R:Si is from about 0.1:1 to about 0.45:1 and the average molar ratio of the sum of R plus R':Si is from about 1:1 to about 1.25:1.

3. Partially condensed organosiloxane copolymers containing structural units which are represented by the formulae:

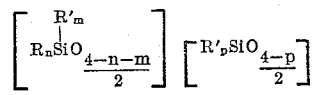

wherein R represents a member selected from the group consisting of chlorophenyl radicals containing from 1 to 5 chlorine atoms attached to the carbon atoms of the phenyl group, alkyl-substituted chlorophenyl radicals and alkoxy-substituted chlorophenyl radicals; R' is a monovalent hydrocarbon radical; $n$ is an integer having a value of 1 and 2; $m$ is an integer having a value of 0 and 1; and $p$ is an integer having a value of from 0 to 3; and the sum of $n$ plus $m$ does not excess 2, and wherein the average molar ratio of R:Si is from about 0.1:1 to about 0.45:1 and the average molar ratio of the sum of R plus R':Si is from about 1.15:1 to about 1.35:1.

4. An organosiloxane molding composition comprising (1) from about 20 to about 50 parts by weight of partially condensed organosiloxane copolymers containing structural units which are represented by the formulae:

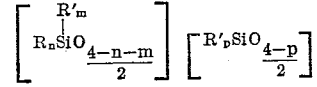

wherein R is a chlorophenyl radical containing from 1 to 5 chlorine atoms attached to the carbon atoms of the phenyl group; R' is a monovalent hydrocarbon radical; $n$ is an integer having a value of 1 and 2; $m$ is an integer having a value of 0 and 1; and $p$ is an integer having a value of from 0 to 3; and the sum of $n$ plus $m$ does not exceed 2, and wherein the average molar ratio of R:Si is from about 0.05:1 to about 0.6:1 and the average molar ratio of the sum of R plus R':Si is from about 0.95:1 to about 1.5:1; (2) from about 50 to about 80 parts by weight of a filler; (3) from about 0.1 to about 2 parts by weight of an accelerator; and (4) from about 0.5 to about 3 parts by weight of a lubricant, said parts by weight being based on 100 parts by weight of the molding composition.

5. An organosiloxane molding composition comprising (1) from about 20 to about 50 parts by weight of partially condensed organosiloxane copolymers containing structural units which are represented by the formulae:

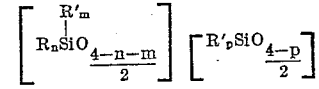

wherein R represents a member selected from the group consisting of chloroalkyl radicals that are free of chlorine atoms on the beta carbon atom, chloropenyl radicals containing from 1 to 5 chlorine atoms attached to the carbon atoms of the phenyl group, alkyl-substituted chlorophenyl radicals and alkoxy-substituted chlorophenyl radicals; R' is a monovalent hydrocarbon radical; $n$ is an integer having a value of 1 and 2; $m$ is an integer having a value of 0 and 1; and $p$ is an integer having a value of from 0 to 3; and the sum of $n$ plus $m$ does not exceed 2, and wherein the average molar ratio of R:Si is from about 0.05:1 to about 0.6:1 and the average molar ratio of the sum of R plus R':Si is from about 0.95:1 to about 1.5:1; (2) from about 50 to about 80 parts by weight of a filler; (3) from about 0.1 to about 2 parts by weight of an accelerator; and (4) from about 0.5 to about 3 parts by weight of a lubricant, said parts by weight being based on 100 parts by weight of the molding composition.

6. Partially condensed organosiloxane copolymers containing dichlorophenylsiloxy units and siloxane units having monovalent hydrocarbon radicals as substituents, wherein the dichlorophenyl:Si molar ratio is from about 0.1:1 to about 0.45:1 and the molar ratio of the sum of the dichlorophenyl plus hydrocarbon radicals:Si is from about 1:1 to about 1.35:1.

7. Partially condensed organosiloxane copolymers containing chlorophenylsiloxy units and siloxane units having monovalent hydrocarbon radicals as substituents, wherein the chloropenyl:Si molar ratio is from about 0.1:1 to about 0.45:1 and the molar ratio of the sum of the chlorophenyl plus hydrocarbon radicals:Si is from about 1:1 to about 1.35:1.

8. Partially condensed organosiloxane copolymers containing pentachlorophenylsiloxy units and siloxane units having monovalent hydrocarbon radicals as substituents, wherein the pentachlorophenyl:Si molar ratio is from about 0.1:1 to about 0.45:1 and the molar ratio of the sum of the pentachlorophenyl plus hydrocarbon radicals:Si is from about 1:1 to about 1.35:1.

9. An organosiloxane molding composition comprising (1) from about 20 to about 50 parts by weight of partially condensed organosiloxane copolymers containing dichlorophenylsiloxy units and siloxane units having monovalent hydrocarbon radicals as substituents wherein the dichlorophenyl:Si molar ratio is from about 0.1:1 to about 0.45:1 and the molar ratio of the sum of the dichlorophenyl plus hydrocarbon radicals:Si is from about 1:1 to about 1.35:1; (2) from about 50 to about 80 parts by weight of a filler; (3) from about 0.1 to about 2 parts by weight of an accelerator; and (4) from about 0.5 to about 3 parts by weight of a lubricant, said parts by weight being based on 100 parts by weight of the molding composition.

10. An organosiloxane molding composition comprising (1) from about 20 to about 50 parts by weight of partially condensed organosiloxane copolymers containing chlorophenylsiloxy units, and siloxane units having monovalent hydrocarbon radicals as substituents wherein the chlorophenyl:Si molar ratio is from about 0.1:1 to about 0.45:1 and the molar ratio of the sum of the chlorophenyl plus hydrocarbon radicals:Si is from about 1:1 to about 1.35:1; (2) from about 50 to about 80 parts by weight of a filler; (3) from about 0.1 to about 2 parts by weight of an accelerator; and (4) from about 0.5 to about 3 parts by weight of a lubricant, said parts by weight being based on 100 parts by weight of the molding composition.

11. An organosiloxane molding composition comprising (1) from about 20 to about 50 parts by weight of partially condensed organosiloxane copolymers containing pentachlorophenylsiloxy units, and siloxane units having monovalent hydrocarbon radicals as substituents wherein the pentachlorophenyl:Si molar ratio is from about 0.1:1 to about 0.45:1 and the molar ratio of the sum of the pentachlorophenyl plus hydrocarbon radicals:Si is from about 1:1 to about 1.35:1; (2) from about 50 to about 80 parts by weight of a filler; (3) from about 0.1 to about 2 parts by weight of an accelerator; and (4) from about 0.5 to about 3 parts by weight of a lubricant, said parts by weight being based on 100 parts by weight of the molding composition.

12. The copolymers of claim 1 wherein R' is a member selected from the group consisting of the methyl and phenyl groups.

13. The copolymers of claim 2 wherein R' is a member selected from the group consisting of the methyl and phenyl groups.

14. The copolymers of claim 3 wherein R' is a member selected from the group consisting of methyl and phenyl groups.

15. The molding composition of claim 5 wherein R' is a member selected from the group consisting of the methyl and phenyl groups.

16. The molding composition of claim 5 wherein R represents a gamma-chloropropyl group.

References Cited in the file of this patent

UNITED STATES PATENTS

| | | |
|---|---|---|
| 2,258,218 | Rochow | Oct. 7, 1941 |
| 2,258,222 | Rochow | Oct. 7, 1941 |
| 2,398,672 | Sauer | Apr. 16, 1946 |
| 2,439,669 | Nordlander | Apr. 13, 1948 |
| 2,492,498 | Pederson | Dec. 27, 1949 |
| 2,501,525 | Krieble et al. | Mar. 21, 1950 |
| 2,513,924 | Elliott et al. | July 4, 1950 |
| 2,599,984 | Fletcher et al. | June 10, 1952 |
| 2,622,072 | Gordon | Dec. 16, 1952 |
| 2,646,441 | Duane | July 21, 1953 |
| 2,652,385 | Hunter et al. | Sept. 15, 1953 |